(12) United States Patent
Whitmarsh

(10) Patent No.: US 7,862,897 B2
(45) Date of Patent: Jan. 4, 2011

(54) BIPHASIC NANOPOROUS VITREOUS CARBON MATERIAL AND METHOD OF MAKING THE SAME

(75) Inventor: Christopher K. Whitmarsh, Niskayuna, NY (US)

(73) Assignee: Carbon Ceramics Company, LLC, Chapel Hill, NC (US)

( * ) Notice: Subject to any disclaimer, the term of this patent is extended or adjusted under 35 U.S.C. 154(b) by 810 days.

(21) Appl. No.: 11/627,940

(22) Filed: Jan. 26, 2007

(65) Prior Publication Data
US 2007/0275863 A1 Nov. 29, 2007

Related U.S. Application Data

(60) Provisional application No. 60/762,588, filed on Jan. 27, 2006.

(51) Int. Cl.
*B32B 9/00* (2006.01)
(52) U.S. Cl. .................................... 428/408; 423/447.1
(58) Field of Classification Search .................. 428/408; 423/447.1, 445 R
See application file for complete search history.

(56) References Cited

U.S. PATENT DOCUMENTS

| | | | |
|---|---|---|---|
| 3,109,712 | A | 11/1963 | Redfern |
| 3,284,371 | A | 11/1966 | Krellner |
| 3,626,042 | A | 12/1971 | Appleby et al. |
| 3,719,452 | A | 3/1973 | Accountius |
| 3,790,393 | A | 2/1974 | Cowland et al. |
| 3,927,186 | A | 12/1975 | Vinton et al. |
| 4,067,956 | A | 1/1978 | Franklin et al. |
| 4,137,477 | A | 1/1979 | Krol et al. |

(Continued)

FOREIGN PATENT DOCUMENTS

| | | |
|---|---|---|
| GB | 593477 A | 10/1947 |
| GB | 624312 A | 6/1949 |
| GB | 2 049 713 A | 12/1980 |
| JP | 56-009693 A | 1/1981 |
| JP | 57-051110 A | 3/1982 |
| JP | 58-055010 A | 4/1983 |
| JP | 58-131429 A | 8/1983 |
| JP | 10-130627 A | 5/1998 |
| WO | 9116826 A1 | 11/1991 |

OTHER PUBLICATIONS

Burton, R.A., et al., "Vitreous carbon matrix for low-wear carbon/metal current collectors", "IEEE Trans. Compon. Hybr.", Jun. 1989, pp. 224-228, vol. 12, No. 2.

(Continued)

*Primary Examiner*—David R Sample
*Assistant Examiner*—Daniel Miller
(74) *Attorney, Agent, or Firm*—David Bradin; Steven J. Hultquist; Intellectual Property, Technology Law

(57) ABSTRACT

A biphasic nanoporous vitreous carbon material with a cementitious morphology characterized by presence of non-round porosity, having superior hardness and tribological properties, as useful for high wear-force applications. The biphasic nanoporous vitreous carbon material is produced by firing, under inert atmosphere, of particulate vitrified carbon in a composition containing (i) a precursor resin that is curable and pyrolyzable to form vitreous carbon and, optionally, (ii) addition of one or more of the following: solid lubricant, such as graphite, boron nitride, or molybdenum disulfide; a heat-resistant fiber reinforcement, such as copper, bronze, iron alloy, graphite, alumina, silica, or silicon carbide; or one or more substances to improve electrical conductivity, such as dendritic copper powder, copper "felt" or graphite flake, to produce a superior vitreous carbon that is useful alone or as a continuous phase in reinforced composites, in relation to conventional glassy carbon materials.

8 Claims, 8 Drawing Sheets

U.S. PATENT DOCUMENTS

| | | | |
|---|---|---|---|
| 4,143,292 A | 3/1979 | Hosoki et al. | |
| 4,150,011 A | 4/1979 | Searfoss et al. | |
| 4,187,209 A | 2/1980 | Searfoss et al. | |
| 4,188,369 A | 2/1980 | Rautavuori et al. | |
| 4,198,382 A | 4/1980 | Matsui | |
| 4,225,569 A | 9/1980 | Matsui et al. | |
| 4,373,038 A | 2/1983 | Moraw et al. | |
| 4,504,441 A | 3/1985 | Kuyper | |
| 4,526,924 A | 7/1985 | Korb et al. | |
| 4,609,972 A | 9/1986 | Edeling et al. | |
| 4,634,531 A | 1/1987 | Nakagawa et al. | |
| 5,182,166 A | 1/1993 | Burton et al. | |
| 5,236,784 A * | 8/1993 | Kobayashi et al. | 428/408 |
| 6,506,482 B1 | 1/2003 | Burton et al. | |
| 6,620,214 B2 | 9/2003 | McArdle et al. | |
| 6,624,108 B1 | 9/2003 | Clark et al. | |
| 2001/0019798 A1 | 9/2001 | Kajiura et al. | |
| 2005/0079201 A1 | 4/2005 | Rathenow et al. | |
| 2008/0150180 A1 | 6/2008 | Whitmarsh | |

OTHER PUBLICATIONS

Burton, R. et al., "Ultra Low Wear in Carbon Matrix Materials", "Tailored Materials Symposium", 1987, pp. 1-16, Publisher: Soc. for Metals.

Burton, R. et al., "Tribology of Carbon Matrix Composites", 1990, pp. 1-22.

Burton, R. et al., "Laser Machining for Advanced Seals", Jan. 4, 1991, pp. 1-15, Publisher: Burton Technologies Inc., Raleigh, NC 27606.

Burton, R. et al., "Friction and Wear of Glassy Carbon in Sliding Contact", "Final Report U.S. Dept. of Energy Contract No. DE-AC02-88 CE 9007", Sep. 1, 1989, pp. 1-43.

QO Chemicals Inc., "MSDS Quacorr 1001 Resin", Feb. 1985, pp. 1-2.

Vook, R. et al., "Electrical Contacts and Electrochemical Components", "Proceedings of the International Conference on Electrical Contacts", May 9, 1989, pp. 66-77.

* cited by examiner

BIPHASIC NANOPOROUS VITREOUS CARBON MATERIAL AND METHOD OF MAKING THE SAME

CROSS-REFERENCE TO RELATED APPLICATIONS

The benefit of priority of U.S. Provisional Patent Application No. 60/762,588 filed Jan. 27, 2006 is hereby claimed under the provisions of 35 USC 120. The disclosure of U.S. Provisional Patent Application No. 60/762,588 is hereby incorporated herein by reference in its entirety.

FIELD OF THE INVENTION

The present invention relates to a biphasic nanoporous vitreous carbon material having utility, inter alia, in tribological applications, and to a method of making the same.

DESCRIPTION OF THE RELATED ART

It is well documented that vitreous carbon has excellent tribological properties (R. A. Burton and R. G. Burton "*Vitreous Carbon Matrix for Low-Wear Carbon/Metal Collectors*" IEEE Transactions June 1989, Vol. 12 No. 2). The restrictive factor in using pure vitreous carbon is that thickness is limited to a maximum of approximately 0.2 in. By incorporating a copper fiber matrix into a vitreous carbon matrix, R. A. Burton and R. G. Burton were able to overcome the thickness limitation, as disclosed in U.S. Pat. Nos. 5,182,166 and 6,506,482. Despite overcoming the thickness limitation, the effort to achieve commercially useful metal-reinforced carbon composites has been intermittently plagued by the tendency of the vitreous carbon to exhibit cracks, and the inability to form large-size vitreous carbon articles with appropriate structural integrity and commercial utility.

SUMMARY OF THE INVENTION

The present invention relates to a biphasic nanoporous vitreous carbon material and method of manufacture thereof.

In one aspect, the invention relates to a biphasic nanoporous vitreous carbon material having a cementitious morphology characterized by presence of non-round porosity.

In another aspect, the invention relates to a biphasic nanoporous vitreous carbon material that exhibits (1) under scanning electron microscopy magnification of 500× a micromorphology substantially corresponding to that shown in FIG. 6 hereof, (2) under scanning electron microscopy magnification of 1000× a micromorphology substantially corresponding to that shown in FIG. 7 hereof, and/or (3) under scanning electron microscopy magnification of 1800× a micromorphology substantially corresponding to that shown in FIG. 8 hereof.

In a further aspect, the invention relates to formation of vitreous carbon material, without the usual limitations of thickness, e.g., wall-thickness, imposed in formation of vitreous carbon articles by the techniques of the prior art. In accordance with such further aspect of the invention, a biphasic nanoporous vitreous carbon material is produced by mixing of particulate vitrified carbon with a suitable precursor resin and firing under an inert atmosphere to produce a solid, glassy carbon body.

A still further aspect of the invention relates to a process for making the vitreous carbon composite material by pyrolysis of particulate, vitrified carbon bonded together by a composition containing (i) a precursor resin curable and pyrolyzable to form vitreous carbon and (ii) the optional addition of other additives for modifying the properties for specific end uses. These additives could include, but are not limited to, additives for modifying friction characteristics of the material (decrease or increase, additives for electrical conductivity enhancement, additives for modifying oxidation/chemical attack resistance, and various fibers/whiskers for enhancement of mechanical strength/toughness. The additives can alternatively be included in the mix (before pyrolysis, or infiltrated into residual porosity of the glassy carbon body after manufacture, depending on the nature of the additive, and the specific end use.

Yet another aspect of the invention relates to a method of making a vitreous carbon body of a predetermined size, comprising forming a plurality of vitreous carbon precursor articles of smaller size than the predetermined size, wherein each of such precursor articles is formed of a cured precursor resin, bonding the plurality of cured vitreous carbon precursor articles to one another with a bonding medium comprising the precursor resin to form an aggregate body, and pyrolyzing the aggregate body including the cured bonding medium, to yield the vitreous carbon body of such predetermined size.

In other words, the catalyzed resin "glue" is applied to cured parts (precursor articles of smaller size, allowed to harden, and the resulting aggregate body is fired.

The invention also contemplates the use of such build-up approach to making a vitreous carbon body of a predetermined size, by using fired vitreous carbon articles of smaller size than the desired product size.

This same procedure can be used to make "repairs" in cured resin objects, involving filling of holes, cracks etc); when fired, the repair is solidly bonded to the parent material, so that it does not crack or fall off.

Other aspects, features and embodiments of the invention will be more fully apparent from the ensuing disclosure and appended claims.

DETAILED DESCRIPTION OF THE INVENTION, AND PREFERRED EMBODIMENTS THEREOF

Figure 1:
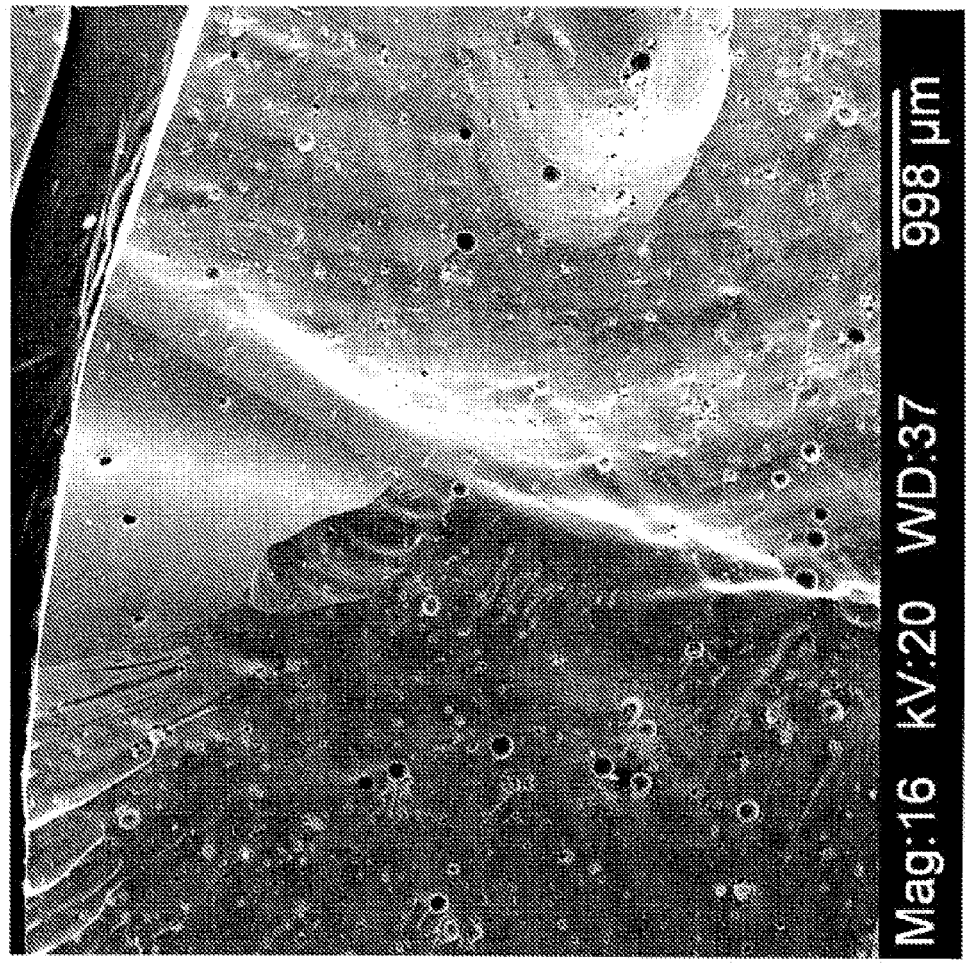
FIG. 1 (PRIOR ART) is a photomicrograph at 16 times magnification (20 kV, 37 WD) of a vitreous carbon material displaying a smooth homogeneous vitreous phase. The term "WD" refers to the working distance and is defined as the distance between the base of the pole piece of the electron microscope and the sample, and is typically measured in millimeters.

The present invention relates to a new vitreous carbon material having utility for tribological applications, and characterized by a biphasic nanoporous morphology.

X-ray diffraction (XRD) and scanning electron microscopy (SEM) studies confirm the vitreous carbon of the invention as a novel composition having a heterogeneous character as opposed to the amorphous character of heretofore known forms of vitreous carbon. Further, the vitreous carbon of the invention has a density that is lower than such known forms of vitreous carbon.

The novel vitreous carbon of the invention can be utilized in various applications as a base material and for composites in which the vitreous carbon of the invention is employed as a continuous phase in combination with other materials, such as for example discontinuous or reinforcing media such as copper and other metals, in powder, fiber or other discontinuous or finely divided form, or carbon powder or fibers, silicon carbide powder or fibers, etc.

Further, in such composite materials applications, the vitreous carbon of the invention by virtue of its nanoporous character, can be impregnated or infiltrated with other materials, and/or surface treated with other materials, such as polymers, metals, semiconductors, etc.

The vitreous carbon of the invention has superior hardness and can be widely varied in electrical properties by utilizing same in composites with conductive components such as graphite, copper, aluminum, and the like. Thermal performance of the vitreous carbon material of the invention can be enhanced by elevated firing of the material in a vacuum furnace, with the maximum firing temperature being determined by the presence in the composite of materials having a melting point in the vicinity of the firing temperature regime. The nanoporous vitreous carbon material can be re-densified to reduce porosity, where such reduction of porosity or void volume is desired.

Engineering of the properties of the vitreous carbon material of the invention can also be effected by varying the length of the firing cycle, e.g., lengthening such cycle to eliminate micro-cracks. Compression strength can also be enhanced by extending the firing cycle of the vitreous carbon material. Flexural strength on the order of 15000 psi and compression strength of 27000-30000 psi are readily obtainable in the vitreous carbon material of the invention.

Additional variation of properties can be achieved by operations such as ion implantation, to provide modified electrical properties, mechanical properties, etc.

The vitreous carbon of the invention is amenable to a wide variety of end uses, including, without limitation, fabrication of EDM electrodes, manufacture of pantograph bars, brake linings, shaft sealing rings, e.g., for compressors and other rotary shaft machinery, etc.

The initial empirical work leading to the discovery of the vitreous carbon of the invention is of interest in elucidating the serendipitous character of the invention of such new material.

The first attempt to generate a glassy carbon monolith involved grinding pre-made glassy carbon (from fired resin) to −200 mesh, then mixing with a minimum amount of resin/catalyst and compressing to about 40 KLbs (ram pressure, or about 4000 psi on the sample. During compaction, it was noted that the sample did not compress in the manner of typical graphite-based materials, which resulted in the final sample being very porous, as attributed to the hard nature of the glassy carbon particulates that were used. The readily compactable nature of graphite allows the use of relatively small amounts of binder (resin) because it compresses so easily, with most of the porosity disappearing during compaction.

This sample was fired, under nitrogen, according to a usual 40 hr ramp to 750° C. Attempts to re-infiltrate with more resin were not particularly successful because the porosity was relatively fine, the resin was fairly viscous, and the catalyst caused the resin to harden after only about 30 minutes so that it did not have time to fully infiltrate the slab of bulk material. When the resulting vitreous carbon material came out of the furnace, the surrounding resin had shrunk when fired and actually pulled some chunks out of the porous monolith. Additionally, there was relatively little diffusion of the resin into the slab. The slab was then re-ground to −200 mesh and remade with a larger amount of resin (40.29 g resin for 106.18 g of glassy carbon dust).

Previously, only 20.03 g had been used for 140.06 g of glassy carbon dust. With the higher level of resin, the final cured sample seemed considerably more solid than the previous one. Contemporaneously, the conception was developed of adding a solid lubricant such as graphite, or molybdenum disulfide, with the objective of improving the friction/wear properties of the final vitreous carbon material for certain applications.

As mentioned in the Background of the Invention section hereof, vitreous carbon has excellent tribological properties but pure vitreous carbon has heretofore had thickness limited to a maximum of approximately 0.2 in. By incorporating a copper fiber matrix into a vitreous carbon matrix, the thickness limitation can be overcome, but this approach yields vitreous carbon that exhibits an unsuitable level of cracks in the final product.

Using the procedure developed by Burton, et al., 1200 grams of copper fiber was immersed in 2100 grams of catalyzed furfural alcohol resin. The metal-resin composite was first cured and then pyrolyzed. The curing treatment was conducted at 200° C. for four hours. Pyrolysis was conducted by slowly heating (0.1° C./min.) to 700° C. followed by slow cooling (0.2° C./min.) to room temperature under nitrogen. Holding times of four hours at temperatures of 350° C., 450° C., 550° C., and 650° C. and a holding time of 10 hours at 700° C. were employed during the heating cycle. Several attempts were made to shorten the long pyrolysis cycle and all ended in failure when thermal decomposition gases literally exploded the composite. It appeared that the rate-controlling mechanism for getting an intact composite was the diffusion of gas through the composite.

During the polymerization and pyrolyzation treatments, the resin lost approximately 40% of its weight. Assuming loss of water was the sole mode of thermal decomposition, calculated losses would be 36.7%. From the odor and the color of condensed water evolved, it was concluded that some hydrocarbons were also emitted in the pyrolyzation process. Similarly, a 34% reduction in volume occurred during the combined curing and pyrolyzation treatments. Photomicrographs of both cured and pyrolyzed composites revealed microporosity in the nanopore dimensional range. The cured composite had a dispersed distribution of pores that was assessed as likely to have formed in the material during the curing step, as addition of the catalyst causes the evolution of hydrogen chloride. In addition to the relatively large pores from the cure step, the pyrolyzed composites had a finer and more general distribution of salt-and-pepper-like pores that were undoubtedly due to the evolution of water and other decomposition gases.

It has long been hypothesized by the present inventor that the cracking that occurred during the pyrolyzation of composites was due to high strains associated with large volume changes during thermal decomposition. Accordingly, even slower heating and cooling to accommodate thermal strain would have no effect on the volume change and would not reduce the cracking propensity.

In the course of my investigations, I discovered that by adding a filler with good lubricating properties (e.g., vitreous carbon, graphite, $MoS_2$ or combinations therof) to the resin, cracking could be eliminated, and that crack-free vitreous carbon composites of superior character could be produced even if the pyrolyzation cycle were accelerated. This discovery in turn created the possibility of producing vitreous carbon in relatively thick sections without having to use copper fiber or other reinforcement to suppress cracking, since copper fiber and discontinuous reinforcing media of like character actually detract from the tribological properties and chemical resistance of the finished composite.

In a preferred aspect, the invention enables the manufacture of defect-free vitreous carbon in unlimited thicknesses by combining vitreous carbon powder with resin, in a timeframe that for many product articles is in a range of from 48 to 72 hours, with correspondingly greater time being required for very thick pieces of the vitreous carbon.

Adding a solid filler greatly reduces the amount of resin needed to form a composite of a given size (relative to one formed without filler) with a corresponding reduction in the volume of gas liberated during pyrolyzation, thereby reducing shrinkage, warping, strain and related cracking. Faster heating and cooling cycles that have been achieved with the filled composite material compositions supports the hypothesis that cracking in prior art vitreous carbon manufacturing is associated with large volumetric changes occurring during the pyrolyzation, and not to the development of thermal strains. It also appears that the slight residual porosity, and relatively large surface area of the filler, provides pathways that allow the pyrolysis gases to escape from relatively thick cross section composites before the pressure of these trapped gases builds up to the point where chips are blown out of the surface, or complete fragmentation of the composite occurs.

Accordingly, the present invention relates to the manufacture of vitreous carbon compositions produced by adding an optional lubricating filler (e.g., vitreous carbon with graphite or $MoS_2$) to the resin and vitrifying the resulting filler-resin composition.

Although Burton, et al. had contemplated that composites could be formed with a suitable lubricant, they were unable to develop any useful approaches for employing same, and years of ensuing research failed to produce any commercially viable vitreous carbon composites based on lubricant components, which were crack-free and of useful size.

The vitreous carbon material of the present invention thus embodies a divergent approach from the mere addition of lubricant components to the resin mix for initial polymerization, and utilizes such lubricant components as diluents in the re-vitrification of pulverized vitreous carbon.

The invention therefore contemplates a composite formation process in which powdered vitreous carbon is added to a precursor resin, followed by vitrification of the powdered vitreous carbon-resin mixture to form a defect-free vitreous carbon product, enabling (1) larger cross-sectioned parts to be achieved, and (2) preparation of defect-free vitreous carbon in about 40-72 hours, a duration that is substantially less than the 160-170 hours that may in some instances be required for formation of conventional vitreous carbon materials.

The invention is more fully illustrated by reference to the photomicrographs of FIGS. 1-8, wherein FIGS. 1-4 are photomicrographs of a conventional vitreous carbon material, and FIGS. 5-8 are photomicrographs of the vitreous carbon material of the present invention.

The vitreous carbon material of FIGS. 1-4 was made by the following procedure.

These samples were made by curing the standard resin with no fillers of any kind, using approximately 2 grams of catalyst per 100 grams of resin, allowing the resulting mixture to solidify and "age" for 2 days, or longer, then heating, under nitrogen, to 750° C. (in 60 hours) followed by a 1 hour hold and shutting off the heat. The cooling rate is not controlled, but occurs over about 6 hrs.

FIG. 1 (PRIOR ART) is a photomicrograph at 16 times magnification (20 kV, 37 WD) of a vitreous carbon material displaying a smooth homogeneous vitreous phase.

Figure 2:
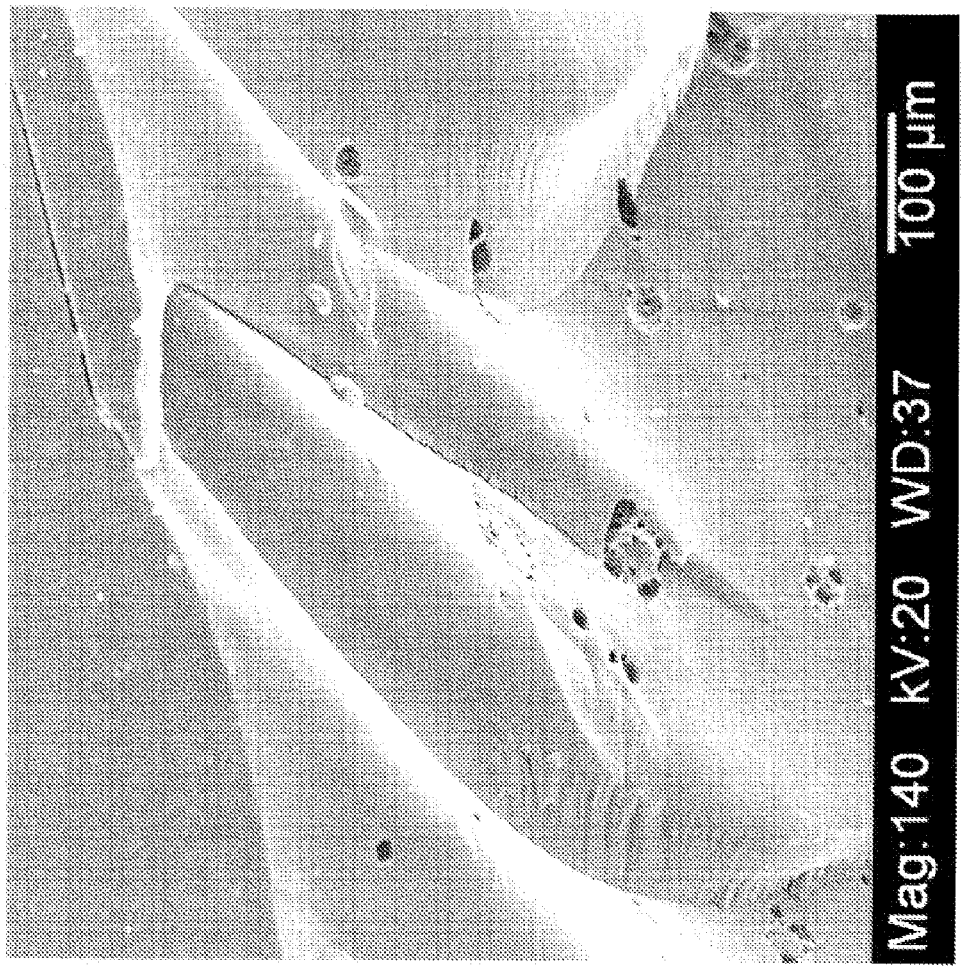
FIG. 2 (PRIOR ART) is a photomicrograph at 140 times magnification (20 kV, 37 WD) of the vitreous carbon material of FIG. 1, displaying a smooth homogeneous vitreous phase.

FIG. 2 (PRIOR ART) is a photomicrograph at 140 times magnification (20 kV, 37 WD) of the vitreous carbon material of FIG. 1, displaying a smooth homogeneous vitreous phase.

Figure 3:
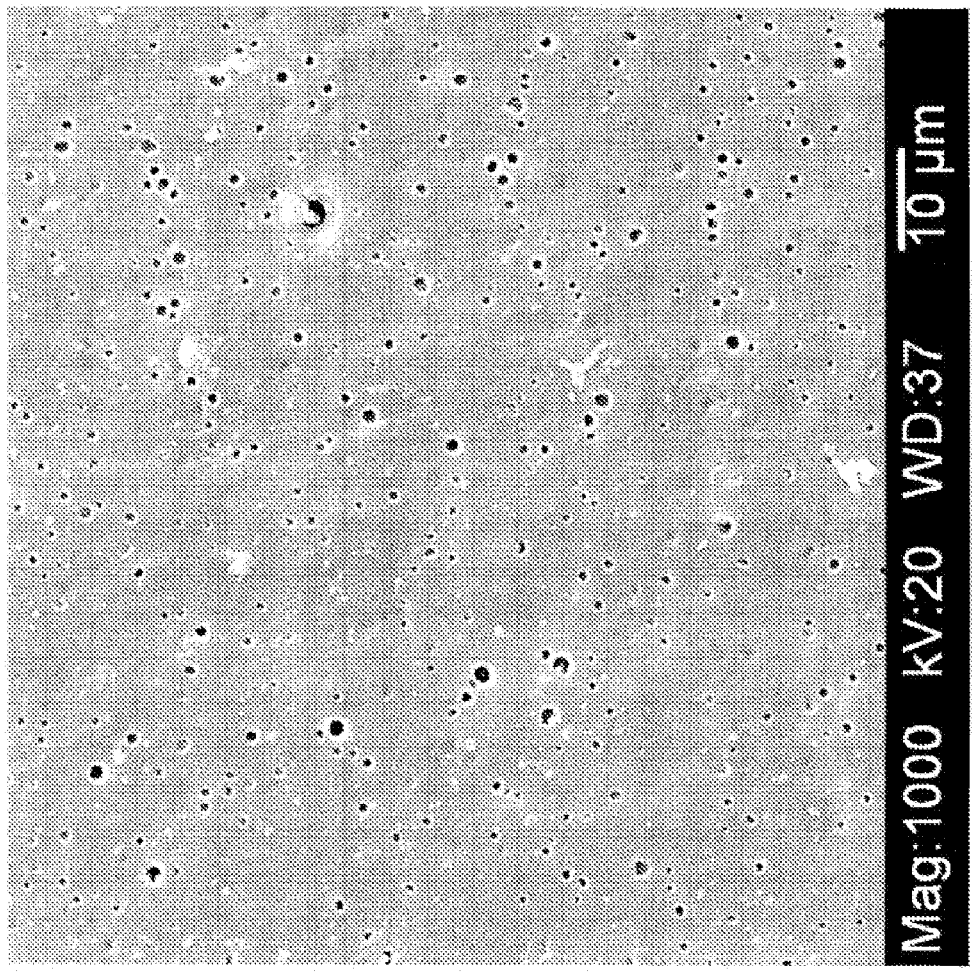
FIG. 3 (PRIOR ART) is a photomicrograph at 1000 times magnification (20 kV, 37 WD) of the vitreous carbon material of FIG. 1, displaying a smooth homogeneous vitreous phase.

FIG. 3 (PRIOR ART) is a photomicrograph at 1000 times magnification (20 kV, 37 WD) of the vitreous carbon material of FIG. 1, displaying a smooth homogeneous vitreous phase.

Figure 4:
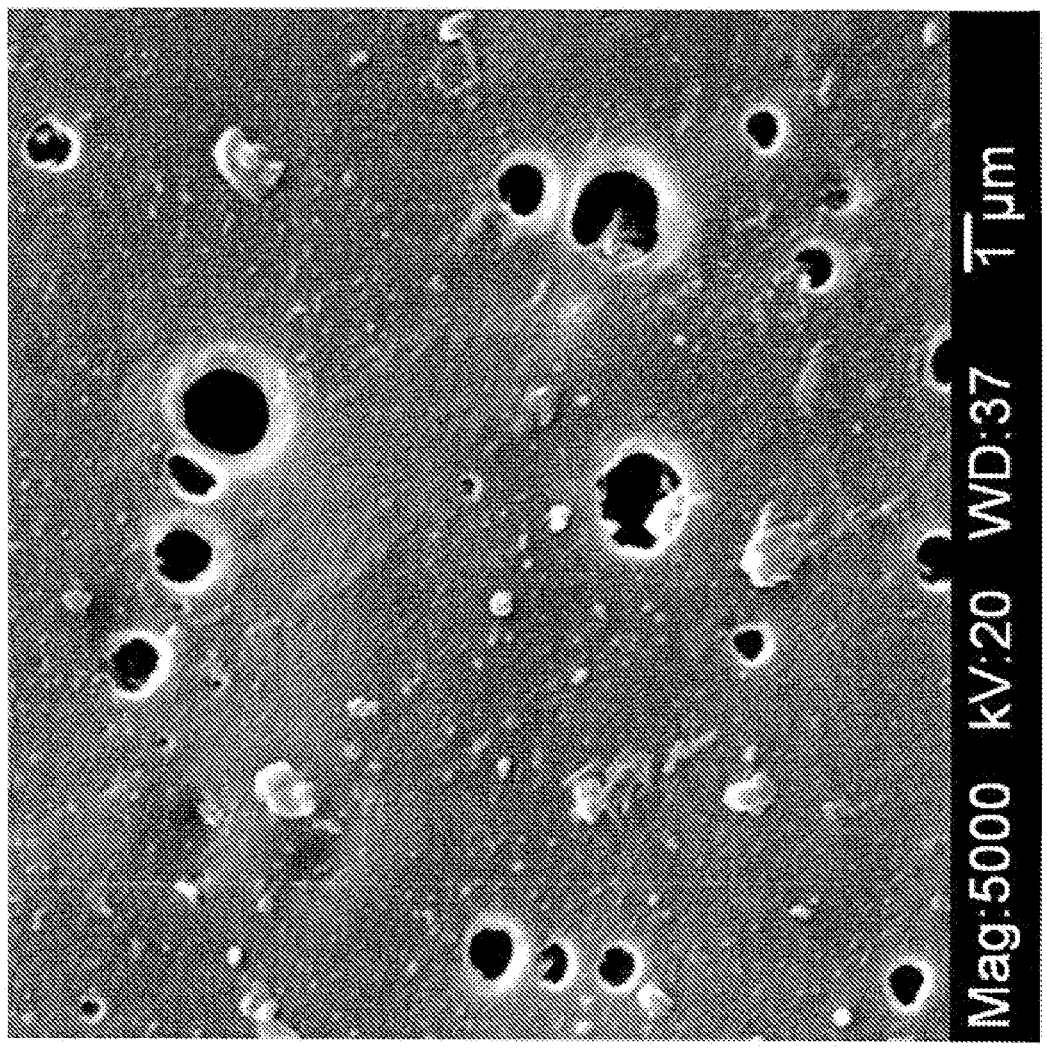
FIG. 4 (PRIOR ART) is a photomicrograph at 5000 times magnification (20 kV, 37 WD) of the vitreous carbon material of FIG. 1, displaying a smooth homogeneous vitreous phase.

FIG. 4 (PRIOR ART) is a photomicrograph at 5000 times magnification (20 kV, 37 WD) of the vitreous carbon material of FIG. 1, displaying a smooth homogeneous vitreous phase.

The photomicrographs of FIGS. 5-8 demonstrate a biphasic nanoporous structure of the vitreous carbon material, which was formed by the following procedure.

The filled samples were formed from 100 grams of ground glassy carbon powder mixed with 40 grams of resin and 2 grams of catalyst; well mixed. The material was pressed in a die under approximately 200 psi to form a slab. This slab was subjected to pyrolysis as described above in the preparation of the samples of FIGS. 1-4.

Figure 5:
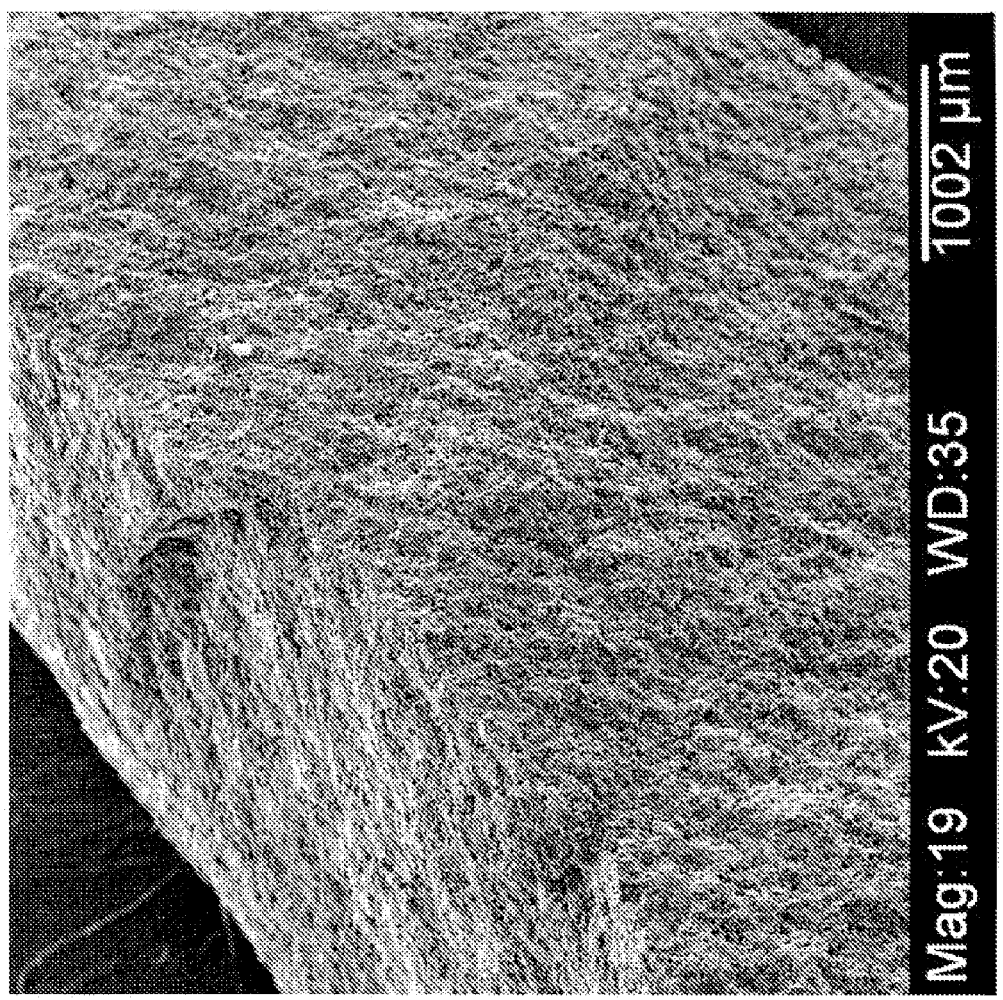
FIG. 5. is a photomicrograph at 19 times magnification (20 kV, 37 WD) of the biphasic nonporous vitreous carbon material of the present invention.

FIG. 5. is a photomicrograph at 19 times magnification (20 kV, 37 WD) of the biphasic nanoporous vitreous carbon material of the present invention.

Figure 6:
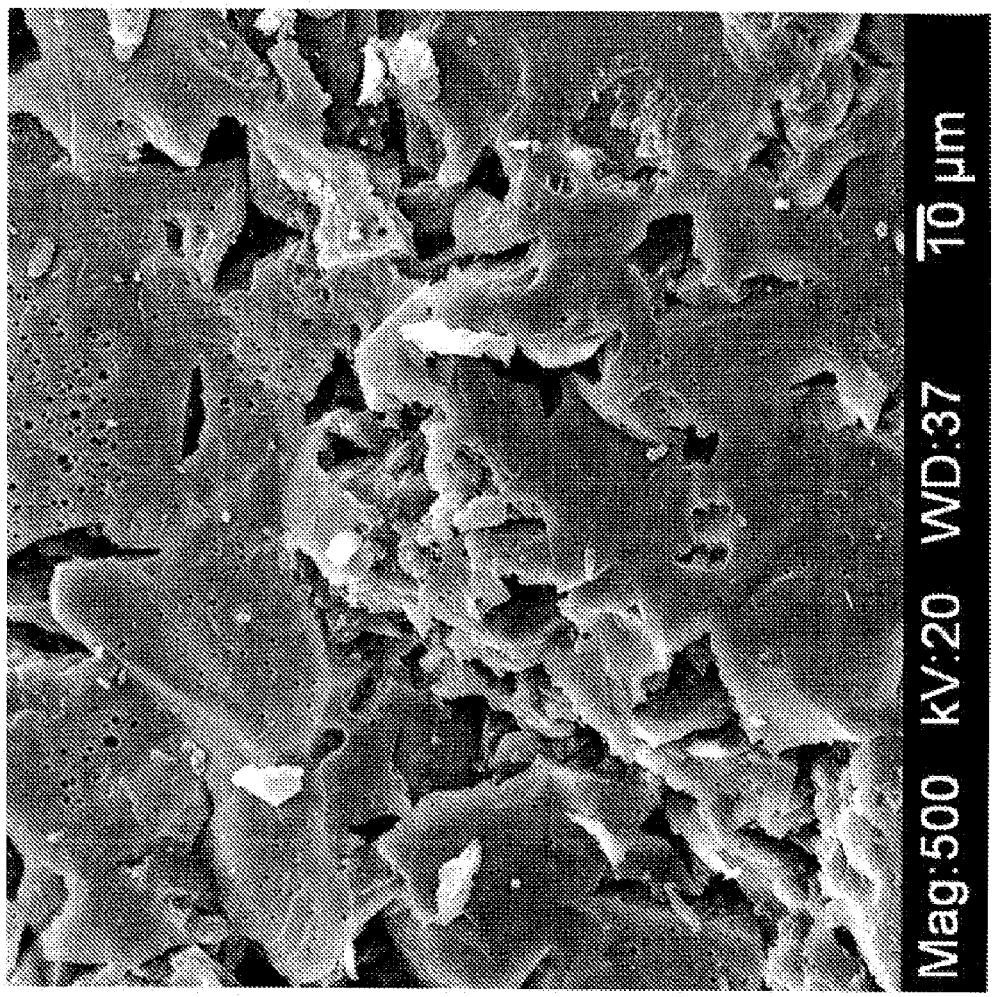
FIG. 6 is a photomicrograph at 500 times magnification (20 kV, 37 WD) of the biphasic nanoporous vitreous carbon material of FIG. 5.

FIG. 6 is a photomicrograph at 500 times magnification (20 kV, 37 WD) of the biphasic nanoporous vitreous carbon material of FIG. 5.

Figure 7:
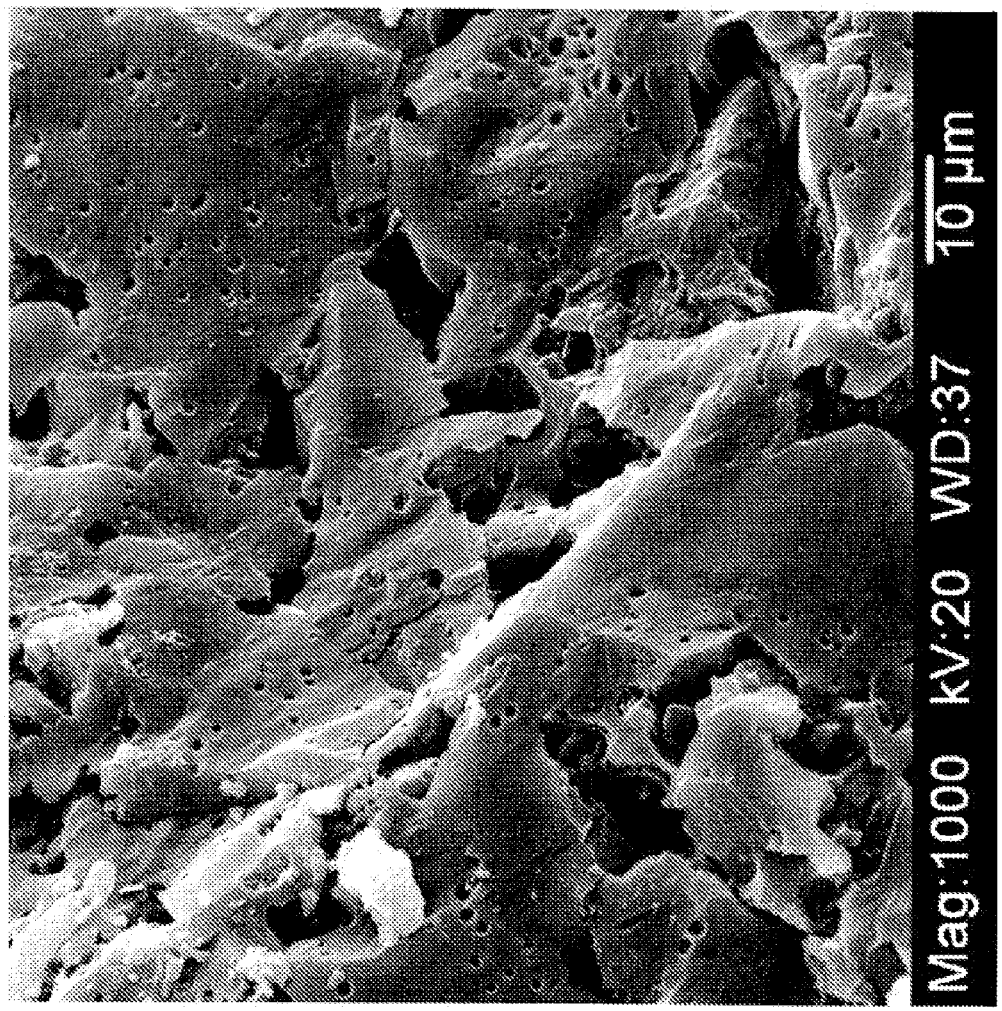
FIG. 7 is a photomicrograph at 1000 times magnification (20 kV, 37 WD) of the biphasic nanoporous vitreous carbon material of FIG. 5.

FIG. 7 is a photomicrograph at 1000 times magnification (20 kV, 37 WD) of the biphasic nanoporous vitreous carbon material of FIG. 5.

Figure 8:
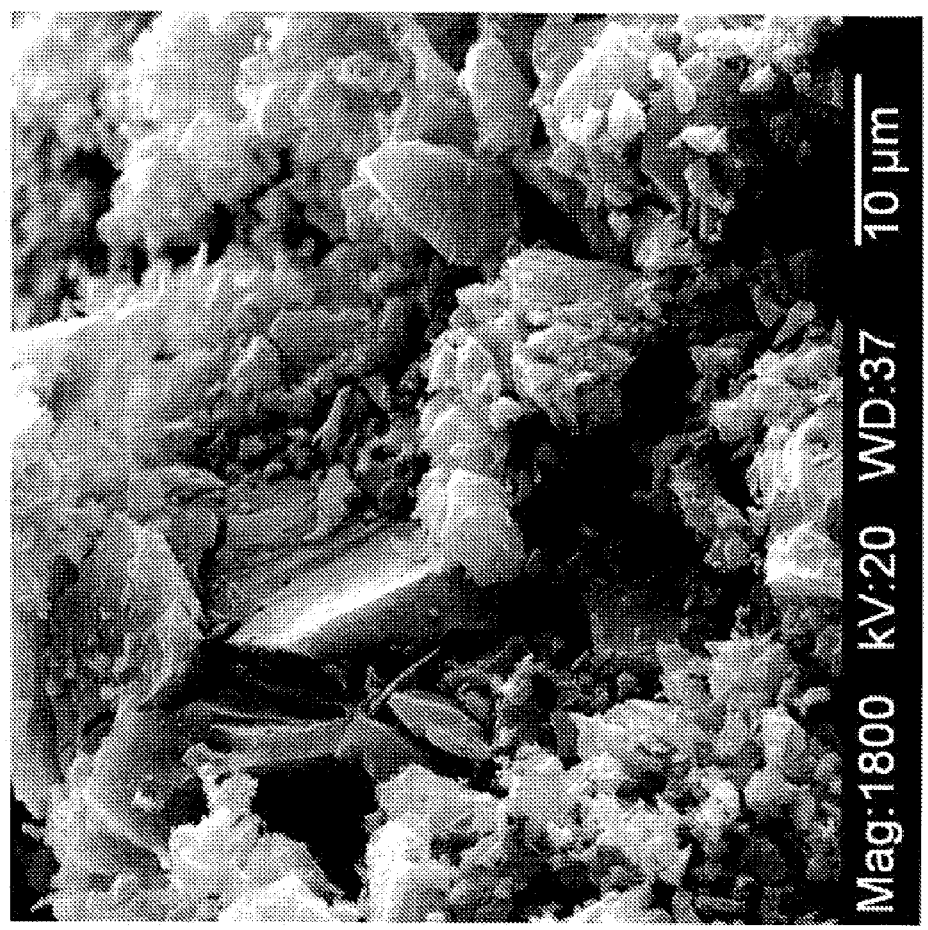
FIG. 8 is a photomicrograph at 1800 times magnification (20 kV, 37 WD) of the biphasic nanoporous vitreous carbon material of FIG. 5.

FIG. 8 is a photomicrograph at 1800 times magnification (20 kV, 37 WD) of the biphasic nanoporous vitreous carbon material of FIG. 5.

It will be appreciated from a comparison of FIGS. 1-4 on the one hand, and FIGS. 5-8 on the other hand, that there is a fundamental micro-morphological difference between the conventional glassy carbon material and the vitreous carbon material of the present invention. As shown in the respective photomicrographs, the conventional glassy carbon material looks smooth and features small bubbles and flaws, while the vitreous carbon material of the present invention has a rough appearance including particles of glassy carbon "cemented" together in a matrix of glassy carbon, as a two-phase, or biphasic, material. Thus, the conventional glassy carbon material of FIGS. 1-4 is amorphous with small round bubbles therein, while the vitreous carbon material of the present invention shown in FIGS. 5-8 is a photomicrographically rough material including angular particles bonded together in a cementitious morphology, with non-round porosity present.

Accordingly, the vitreous carbon material of the present invention can be characterized as exhibiting under scanning electron microscopy magnification in a range of 500× to 1800× the micromorphology of FIGS. 6-8 hereof, including a cementitious morphology, with non-round porosity present.

The wear characteristics of the vitreous carbon material of the present invention were assessed in tests showing such material to have superior wear properties.

The materials are usually tested using the "block on ring", "thrust washer", "face seal" or "journal bearing" test (depending on the final end use). These tests can for example be conducted by commercial testing laboratories, such as for example Falex Corporation (Sugar Grove, Ill.), or other materials evaluation business concerns offering tribology testing services, and evaluations of friction, wear, lubrication and abrasion properties of materials.

Samples of the filled glassy carbon (~75% filler) were measured by hexane immersion density to be on the order of 1.31 g/cc with about 13.8% porosity. Density from direct physical measurement of a cylinder (bulk density; does not account for porosity) was 1.2 g/cc.

In one embodiment of the invention, glassy carbon-bonded graphite articles, e.g., containing dendritic copper as a filler, are utilized for fabrication of motor brushes.

The present invention provides a biphasic nanoporous vitreous carbon material having a cementitious morphology characterized by presence of non-round porosity.

The biphasic nanoporous vitreous carbon material of the invention exhibits (1) under scanning electron microscopy magnification of 500× a micro-morphology substantially corresponding to that shown in FIG. 6 hereof, (2) under scanning electron microscopy magnification of 1000× a micro-morphology substantially corresponding to that shown in FIG. 7 hereof, and (3) under scanning electron microscopy magnification of 1800× a micro-morphology substantially corresponding to that shown in FIG. 8 hereof.

The biphasic nanoporous vitreous carbon material of the invention is produced by pyrolysis of particulate vitrified carbon in a composition containing (i) a precursor resin curable and pyrolyzable to form vitreous carbon and, optionally, (ii) a solid lubricant. This lubricant additive, in one preferred embodiment of the invention, is selected from the group consisting of graphite and molybdenum disulfide.

The biphasic nanoporous vitreous carbon material of the invention typically has a density in a range of from about 1.2 to about 1.4 g/cc depending on percentage of filler used, and is substantially crack-free in character. The vitreous carbon material may be formed either with, or without the presence of reinforcement fibers therein, e.g., fibers formed of material selected from the group consisting of copper, bronze, graphite, and silicon carbide. Due to the relatively short pyrolysis cycle, iron, steel and other carbide-forming metals/alloys can be used as filaments, powders etc.

The process for making the vitreous carbon composite material comprises pyrolysis, under inert atmosphere, of particulate vitrified carbon in a composition containing (i) a precursor resin curable and pyrolyzable to form vitreous carbon and (ii) optionally, a solid lubricant, or other modifying additive(s) as described previously. The process advantageously includes curing of the precursor resin in the composition under conditions where excessive heat generation during the exothermic curing step is avoided to minimize bubble formation and/or degradation of the "raw" composite. This is usually accomplished by optimizing the amount of catalyst for that particular formulation, or by cooling, as necessary, during the curing process. The presence of certain fillers, such as copper felt, will assist in preventing overheating, but is not a requirement for the process to be successful. A sieve analysis of the ground glassy carbon powder showed the following size distribution: larger than #40 mesh 4.82%; smaller than #40 but larger than #100 mesh 11.85%; smaller than #100 but larger than #200 mesh 7.82%; smaller than #200 mesh 75.55%. The exact size range of the filler is not important, as long as there are not a lot of large chunks in the material. For certain applications, it may be desirable to use one or more specified particle sizes to maximize particle packing density.

The polymerization can be carried out with the composition containing a fiber reinforcement, e.g., fibers formed of material selected from the group consisting of copper, bronze, iron alloys, other metals, graphite, carbon, boron nitride, and silicon carbide, other oxide and non-oxide ceramics. The precursor resin can be polymer or oligomer derived from furfuryl alcohol, or any other suitable precursor material that yields glassy carbon on pyrolysis, usually containing a curing agent or catalyst. For example, the reinforcement can include chopped carbon fiber, woven carbon fiber, alumina, silica, silicon carbide, silicon nitride, etc.

The reference to fiber reinforcement is intended to be broadly construed as encompassing fibers per se, as well as woven, aggregated, and non-woven reinforcement media formed therefrom. Thus, the reinforcement in the vitreous carbon material of the invention can include cloth, scrim, felt, batting, and other forms incorporating fibers or fibrous material.

The vitreous carbon material of the invention can include as an optional added component of the precursor composition that is subjected to curing and pyrolysis, a solid lubricant, e.g., graphite, boron nitride, molybdenum sulfide, etc., or other additive for modification of the tribological, electrical, or mechanical properties of the vitreous carbon material.

The vitreous carbon material of the invention can have a density in the range of from about 1.2 to about 1.5 grams per cubic centimeter, and is substantially crack-free in character. The vitreous carbon material may be devoid of any metal fiber reinforcement therein, or it alternatively may contain metal reinforcement fibers therein, or alternatively it may contain ceramic or carbon reinforcement fibers or non-fibrous media therein. Fibers can include metals such as copper, bronze, steel, ferrous alloys, as well as graphite, alumina, silica, silicon carbide, etc.

The catalyzed precursor composition may be fired to form the cured, pyrolyzed vitreous carbon material under any suitable process conditions. In one preferred embodiment, the catalyzed precursor material is fired under an inert atmosphere, e.g., of nitrogen, helium, argon, etc. Heat of polymerization can be removed from the composition during curing by any suitable means or technique, e.g., involving heat exchange media, convective cooling, use of extended area heat dissipation surface, etc. Preferably, the heat of polymerization is removed to avoid the generation of excessive bubbles, so that a nanoporous material of desired micro-morphology and performance properties is produced. In most cases, heat evolution can be controlled by adjusting catalyst concentration in the precursor mix.

The size of the particulate vitrified carbon that is used as a filler for the precursor resin in the vitreous carbon material of the invention can be of any suitable particle size and particle size distribution character. In one embodiment, the particulate vitrified carbon has an average particle size in a range of from about #40 mesh to sub-micron size. In another embodiment, the particulate vitrified carbon has an average particle size in a range of from about #200 mesh to sub-micron size.

A preferred precursor resin comprises a polymeric and/or oligomeric material derived from furfuryl alcohol, e.g., a furfuryl alcohol monomer or oligomer, as described in the aforementioned Burton, et al. patents, as well as the use of curing catalysts of the types described in such patents.

The process includes pyrolyzation of the composite after curing, to convert the resin into a glassy carbon matrix. The pyrolyzation temperature ramp profile is typically from room temperature to 750° C. in 40-60 hr with a 1 hour hold, however slower heating, and higher final temperatures (up to about 2500° C.) can be used for very large cross-sectioned parts, and in applications requiring very high purity carbon, respectively.

The invention in another aspect contemplates "super-aggregated composites" formed of the biphasic nanoporous vitreous carbon material of the invention, in which various precursor bodies, formed of the composition containing particulate vitrified carbon and precursor resin, after curing and before pyrolysis (i.e., as a so-called "green body" material, are bonded together to form a consolidated body, by a bonding medium including the precursor resin and catalyst, in a state prior to cure of the precursor resin in the bonding medium. The resulting consolidated body then undergoes curing of the bonding medium, followed by pyrolysis to form a biphasic nanoporous vitreous carbon consolidated body.

By such technique, the invention provides a method of making a vitreous carbon body of a predetermined size, in which a plurality of vitreous carbon precursor articles of smaller size than the predetermined size is formed, wherein each of such precursor articles is formed of a cured precursor resin. The plurality of cured vitreous carbon precursor articles are bonded to one another, using a bonding medium including the precursor resin, to form an aggregate body, and the aggregate body, including the cured bonding medium, then is pyrolyzed, to yield the vitreous carbon body of such predetermined size.

In this manner, using the catalyzed precursor resin in a less than fully cured state as a "glue" for the pieces of the vitreous carbon precursor material of the invention, it is possible to manufacture a substantially larger composite article, which in turn can be subjected to aggregation with other articles of the same material and general size or scale, to form even larger product bodies of the biphasic nanoporous vitreous carbon.

Such repetitive aggregation and consolidation of successively larger-sized bodies of the material of the invention, can be employed to "scale up" the size of the end-product biphasic nanoporous vitreous carbon material body to a desired ultimate dimensional character.

This process involves the catalyzed resin glue being applied to the cured precursor carbon articles, which thereupon hardens, following which the aggregate body can be augmented with bonding of additional pieces of the cured precursor material, to achieve even larger overall size, with the ultimately desired aggregated body being pyrolyzed to form the vitreous carbon product article of the desired size. In a preferred embodiment, the bonding medium contains particulate vitrified carbon dispersed in the precursor resin, so that the composition of the bonding medium corresponds to that of the cured precursor carbon articles, and so that the changes in the bonding medium during pyrolysis match the changes during such pyrolysis that occur in the cured precursor articles that constitute the pieces or building blocks of the aggregated body.

The invention also contemplates a corresponding approach to making a vitreous carbon body of a predetermined size, using fired vitreous carbon articles of smaller size than the desired product size, which are "glued" together in the same manner as described to form the aggregate article.

A corresponding procedure can also be used to make "repairs" in cured resin objects, in which the catalyzed resin that is in an uncured, or partially cured, state is used as a filler in cracks, spalls, etc. of the cured resin object.

It will be recognized that the invention may be carried out in any suitable manner consistent with the disclosure herein, to provide vitreous carbon material of superior hardness and tribological properties, and that specific polymerization and pyrolysis operations may be conducted in specific temperature and time regimes, under appropriate process conditions, to realize the advantages and features of the invention.

While the invention has been has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Correspondingly, the invention as hereinafter claimed is intended to be broadly construed and interpreted, as including all such variations, modifications and alternative embodiments, within its spirit and scope.

What is claimed is:

1. A biphasic nanoporous vitreous carbon material in the form of a solid glassy carbon body produced by firing, under inert atmosphere, of particulate vitrified carbon in a composition containing (i) a precursor resin curable and pyrolyzable to form vitreous carbon and, optionally, (ii) at least one additive selected from the group consisting of (a) solid lubricants and (b) additives that modify tribological, electrical, or mechanical properties,
    wherein the material is substantially crack-free in character, and wherein the particulate vitrified carbon has an average particle size in a range of from about #40 mesh to sub-micron size.

2. The biphasic nanoporous vitreous carbon material of claim 1, including additives comprising a solid lubricant and at least one material selected from the group consisting of graphite, boron nitride, and molybdenum disulfide.

3. The biphasic nanoporous vitreous carbon material of claim 1, wherein the solid lubricant comprises molybdenum disulfide.

4. The biphasic nanoporous vitreous carbon material of claim 1, having a density in a range of from about 1.2 to about 1.5 g/cc.

5. The biphasic nanoporous vitreous carbon material of claim 1, having no metal fiber reinforcement therein.

6. A composite material comprising a biphasic nanoporous vitreous carbon material as claimed in claim 1, and containing metal, ceramic or carbon reinforcement fibers therein.

7. The composite material of claim 6, comprising metal reinforcement fibers including fibers formed of material selected from the group consisting of copper, bronze, steel, ferrous alloys, graphite, alumina, silica, and silicon carbide.

8. The composite material of claim 1, wherein the material has a thickness greater than approximately 0.2 inches.

* * * * *

UNITED STATES PATENT AND TRADEMARK OFFICE
CERTIFICATE OF CORRECTION

| | |
|---|---|
| PATENT NO. | : 7,862,897 B2 |
| APPLICATION NO. | : 11/627940 |
| DATED | : January 4, 2011 |
| INVENTOR(S) | : Christopher K. Whitmarsh |

It is certified that error appears in the above-identified patent and that said Letters Patent is hereby corrected as shown below:

Column 2, line 24: "smaller size," should be -- smaller size), --.

Column 9, line 14: "material," should be -- material), --.

Signed and Sealed this
Twenty-second Day of March, 2011

David J. Kappos
*Director of the United States Patent and Trademark Office*